United States Patent
Lee

(10) Patent No.: US 12,541,031 B2
(45) Date of Patent: Feb. 3, 2026

(54) METHOD AND SYSTEM FOR PRESUMPTIVE RECOGNITION OF A MEETING BETWEEN PEOPLE USING RTK TECHNOLOGY

(71) Applicant: Sangjoo Lee, Seoul (KR)

(72) Inventor: Sangjoo Lee, Seoul (KR)

( * ) Notice: Subject to any disclaimer, the term of this patent is extended or adjusted under 35 U.S.C. 154(b) by 329 days.

(21) Appl. No.: 18/197,773

(22) Filed: May 16, 2023

(65) Prior Publication Data
US 2023/0280479 A1    Sep. 7, 2023

Related U.S. Application Data

(63) Continuation of application No. PCT/KR2020/016539, filed on Nov. 22, 2020.

(51) Int. Cl.
*G01S 19/51*    (2010.01)
*G01S 19/43*    (2010.01)

(52) U.S. Cl.
CPC .............. *G01S 19/51* (2013.01); *G01S 19/43* (2013.01)

(58) Field of Classification Search
CPC ................................ G01S 19/43; G01S 19/51
See application file for complete search history.

(56) References Cited

U.S. PATENT DOCUMENTS 6,430,498 B1 *  8/2002  Maruyama ............. G01C 21/20
                                                      701/526
6,504,503 B1 *  1/2003  Saint-Hilaire .......... G01S 19/42
                                                      455/457

2013/0030684 A1 *  1/2013  Wirola ..................... G01S 19/43
                                                      701/300

(Continued)

FOREIGN PATENT DOCUMENTS

KR    10-2011-0123335 A    11/2011
KR    10-2014-0121939 A    10/2014
(Continued)

OTHER PUBLICATIONS

S. Lightbody et al., Techniques in Relative RTK GNSS Positioning, Trimble White Paper, 6 pages (Year: 2010).*

(Continued)

*Primary Examiner* — Robert W Hodge
*Assistant Examiner* — Fred H Mull
(74) *Attorney, Agent, or Firm* — LRK PATENT LAW FIRM

(57) ABSTRACT

A precise positioning-based method for presumptively determining if two people are actually meeting includes two applications of terminal devices capable of receiving navigation satellite (GNSS) signal and an application server, wherein one of the applications or the application server has an ability to performing RTK algorithm to calculate a terminal-to-terminal distance between the two terminal devices using satellite observation data. The application server generates a presumptive recognition that terminal device holders have met if pattern of the terminal-to-terminal distance meets a preset criterion. Terminal device holders can raise objections through terminal device applications to rebut the presumptive recognition only if there is something wrong, which thereby expedites related work without waiting for the cooperation of terminal device holders.

4 Claims, 3 Drawing Sheets

(56) References Cited

U.S. PATENT DOCUMENTS

2018/0246222 A1* 8/2018 Song ................. G01S 19/51

FOREIGN PATENT DOCUMENTS

| KR | 10-2016-0135024 A | 11/2016 |
| KR | 10-2017-0133031 A | 12/2017 |
| KR | 10-1905144 B1 | 10/2018 |
| KR | 10-2020-0131136 A | 11/2020 |

OTHER PUBLICATIONS

X. Jardin, Privacy invasion? Facebook is using your phone's location data to suggest friends, Boing Boing, https://boingboing.net/2016/06/27/privacy-invasion-facebook-is.html, 4 pages (Year: 2016).*

Search Report, mailed Aug. 18, 2021, for International Application No. PCT/KR2020/016539.

Written Opinion, mailed Aug. 18, 2021, for International Application No. PCT/KR2020/016539.

* cited by examiner

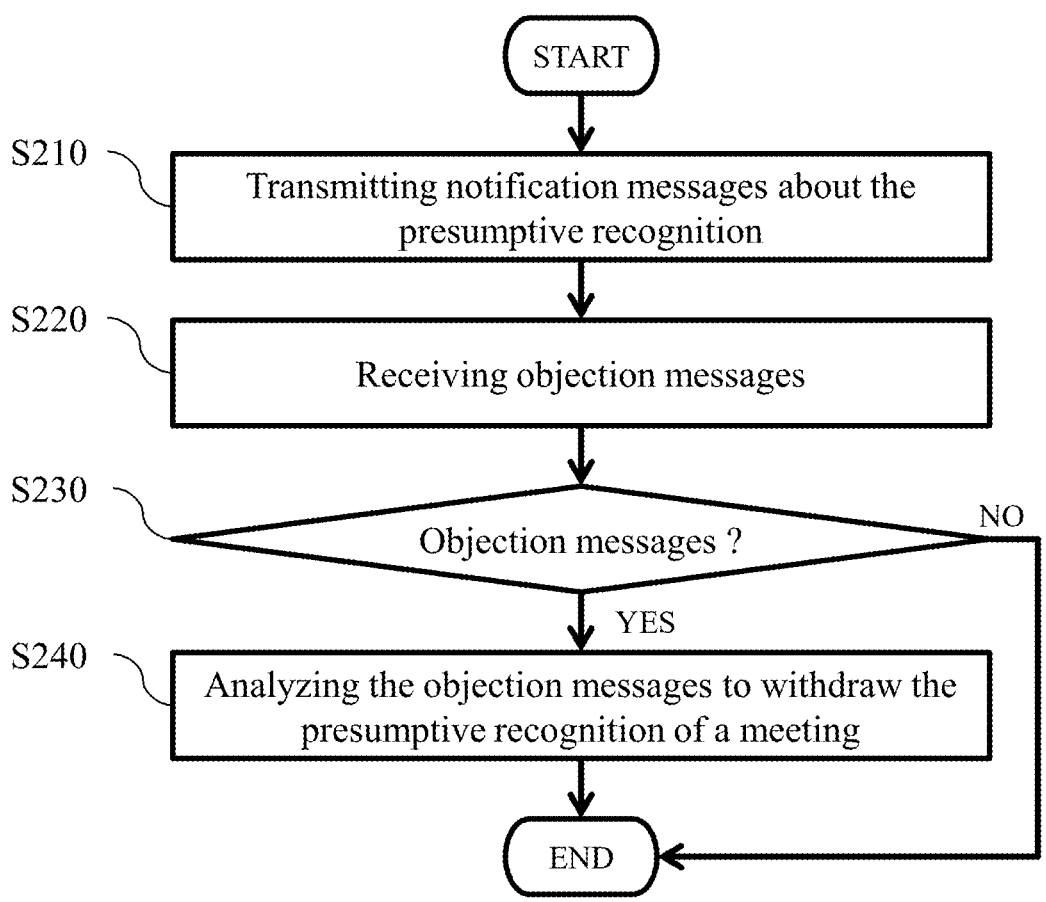

METHOD AND SYSTEM FOR PRESUMPTIVE RECOGNITION OF A MEETING BETWEEN PEOPLE USING RTK TECHNOLOGY

CROSS-REFERENCE TO RELATED APPLICATION(S)

This application is a continuation of International Application No. PCT/KR2020/016539, filed on Nov. 22, 2020, the entire content of which is hereby incorporated by reference.

BACKGROUND OF THE INVENTION

1. Field of the Invention

The present invention relates to the field of real-time precise positioning systems and methods using GNSS (Global Navigation Satellite System).

2. Description of Related Art

Positioning methods using the GNSS satellite signals inevitably have poor accuracy due to various errors inherent in the GNSS satellite signals. For expansion into applications requiring higher reliability, GNSS correction service which improves positioning accuracy by using error correction information measured and calculated by a reference station is used.

For GNSS correction service, various types of GNSS error correction signals have been developed and are largely classified into SSR (State Space Representation) method and OSR (Observation Space Representation) method.

SSR-based error correction signals typically include error correction signal transmitted from SBAS (Satellite Based Augmentation System) satellites and PPP-RTK correction signal which is considered as a next-generation error correction signal.

OSR-based error correction signals typically include DGPS correction signal that supports meter level positioning using low-cost receivers and RTK (Real-Time Kinematic) correction signal that supports centimeter level high-precision positioning.

DGPS (Differential GPS) refers to various positioning methods that process GNSS observation data by differential positioning in a broad sense, but refers to an OSR method that supports positioning using GNSS code observation data in a narrow sense. RTK, which is a real-time precise positioning, uses carrier wave of GNSS (GPS) signals to calculate position. Therefore accuracy of RTK is relatively higher than accuracy of DGPS which uses only GNSS codes.

NRTK (Network-based Real Time Kinematic) connects multiple reference stations into a network, collects error correction signals from multiple reference stations placed near the user's position, and then comprehensively utilizes them to correct RTK errors suitable for the user's position. An error correction signal suitable for a terminal device is generated by interpolation. NRTK has the advantage of being able to support a wide area with limited reference station resources by virtue of this interpolation capability.

If the baseline distance between two points is less than 10 km, the relative positioning method can be used, which removes the common error contained in the satellite signals received at the two points and measures relative position between the two points using the double difference technique. This method has high precision and can be used for precise geodetic surveys, but if distance between two points exceeds 10 km, the premise that the error included in the satellite signal is common does not hold, so the precision is greatly reduced.

The RTK system of the relative positioning method generally uses a reference station that knows its precise position, a user terminal device which determines integer ambiguity of a double-differentiated carrier using data transmitted from the reference station and estimates the current position, and a data communication link for transmitting satellite observation data from the reference station to the user terminal device. However, if only relative position between two user terminal devices is needed, a dedicated local base station or a CORS (Continuously Operating Reference Station) whose precise position is known can be eliminated from the prerequisite.

SUMMARY OF THE INVENTION

In the case of providing services where person-to-person meeting is the purpose or an important means, if the person who has the power to recognize that a meeting has occurred is a service user, not a business operator, it may be delayed or impossible for the business operator to handle follow-up tasks due to noncooperation of the service user. Business structure where a service user evaluates the performance of the service first and the business operator appeals later is time consuming and is possibly one of the factors that greatly threaten the business feasibility. Therefore, a reliable technical proof system that converts a recognizer from a service user to a business operator will benefit service providers.

Given GNSS observation data obtained from a terminal device possessed by a service user, an application server performs the RTK algorithm of the relative positioning method to calculate distance between the two terminal devices, generates a presumptive recognition that holders of the two terminal devices have met if pattern of distance between the terminal devices meets a certain criteria, and then receives objections from the terminal holder who is the service user, for a certain period of time to challenge the presumptive recognition. One of the two terminal devices also has the power to perform the RTK algorithm of the relative positioning method and can calculate distance between the two terminal devices on behalf of the application server.

In the present invention, for a service where a meeting between people is the main content, a method is presented to recognize a meeting between people with a precise position measurement, to perform subsequent operations without delay, thereby to reduce related costs and increase efficiency.

After accurately calculating the distance between the terminal devices using the navigation satellites and RTK technology, if pattern of the terminal distance meets a certain criterion, it is presumptively recognized that the holders of the terminal devices have met, and terminal device holders are given the right to raise an objection only in special exceptions where the meeting does not occur but pattern of terminal distance meets the certain criterion. If service users do not raise an objection for a certain period of time, it is deemed that they agree to the presumptive recognition. By reversing the role of the two parties regarding recognition of a meeting, the success rate of the service can be increased, and payment or post-processing can be performed without delay according to a pre-determined schedule. Hence, a business operator can have the advantage of saving manpower, time and cost and therefore, increasing the profit rate.

BRIEF DESCRIPTION OF THE DRAWINGS

FIG. 3 is a flowchart illustrating a procedure for receiving and processing an objection to the presumptive recognition of a meeting.

DETAILED DESCRIPTION OF THE INVENTION

Specific structural or functional descriptions of the embodiments disclosed in the specification or application of the present invention are for illustrative purpose only and do not limit the present invention. Descriptions of technical contents that are well known in the technical field to which the present invention pertains and are not directly related to the present invention will be omitted.

Figure 1:
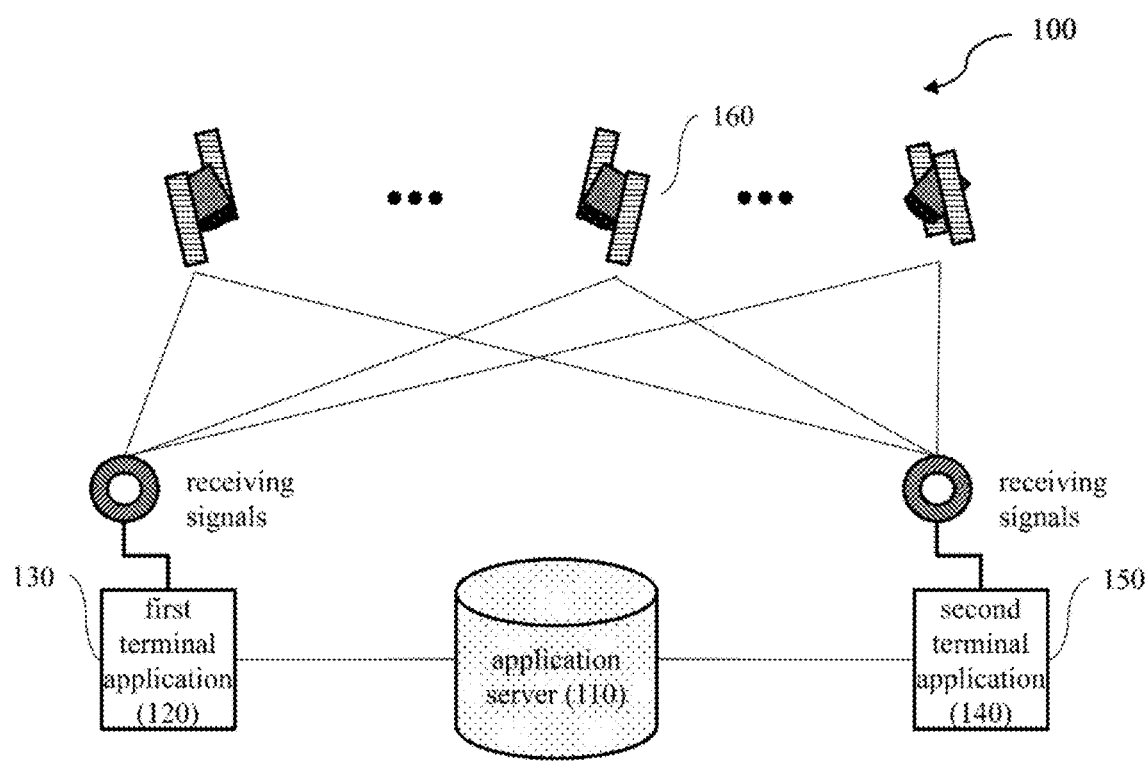
FIG. 1 is a conceptual diagram schematically illustrating a system for presumptive recognition of a meeting between people and processing objections.

FIG. 1 is a conceptual diagram schematically illustrating a system for presumptive recognition of a meeting between people and processing objections.

As shown in FIG. 1, the system 100 for presumptive recognition of a meeting and processing objections includes GNSS navigation satellites 160, a first terminal device 130 receiving signals from the GNSS navigation satellites 160, a first terminal application 120 driving the first terminal device 130, a second terminal device 150 receiving signals from the GNSS navigation satellites 160, the second terminal application 140 driving the second terminal device 150, and an application server 110 in charge of controlling and processing meeting service task. The first terminal device 130 or the second terminal device 150 includes a mobile terminal device such as a smart phone, a tablet PC, or a navigation terminal device.

In the present embodiment, only the first terminal device 130, the first terminal application 120 driving the first terminal device 130, the second terminal device 150, and the second terminal application 140 driving the second terminal device 150 are described, but this embodiment can be expanded to three or more terminal applications and terminal devices by using a star topology method that use one terminal device as a base terminal device and calculates the distances between the base terminal device and other terminal devices or by using other methods.

The GNSS navigation satellites 160 include satellites of the Global Positioning System (GPS) of the United States, the Galileo satellites of Europe, satellites of the Global Navigation Satellite System (GLONASS) of Russia, and/or the BeiDou satellites of China.

One of the application server 110, the first terminal application 120, or the second terminal application 140 is an RTK algorithm execution unit having a function of performing an RTK algorithm, and the first terminal application 120 and the second terminal application 140 derive satellite observation data from received satellite signals of the GNSS navigation satellites 160 and, if they are not the RTK algorithm execution unit, transmit the satellite observation data to the RTK algorithm execution unit.

Given the satellite observation data of the first terminal device 130 and the satellite observation data of the second terminal device 150, the RTK algorithm execution unit calculates the relative distance between the first terminal device 130 and the second terminal the device 150 without the aid of a ground reference station. Other methods to calculate the absolute position of the first terminal device and the absolute position of the second terminal device with the aid of ground reference stations for obtaining the relative distance between the first terminal device and the second terminal device may weaken the evidence of a meeting because positioning errors accumulate due to the unnecessary intervention of ground reference stations.

The RTK algorithm execution unit periodically calculates the terminal-to-terminal distance, and the application server 110 analyzes pattern of the terminal-to-terminal distance. And if the analysis result satisfies a certain criterion, the application server 110 generates presumptive recognition that the holder of the first terminal device 130 and the holder of the second terminal device 150 have met, and processes related tasks with no delay.

The system 100 for generating presumptive recognitions and processing objections can be applied to a delivery service for ordered products. The first terminal device 130 is possessed by an orderer and the second terminal device 150 is possessed by a delivery person. If pattern of the distance between the terminal devices satisfies a certain standard policy set by a delivery service provider, the system 100 generates a presumptive recognition that an orderer and a delivery person have met and ordered products have been delivered.

Figure 2:
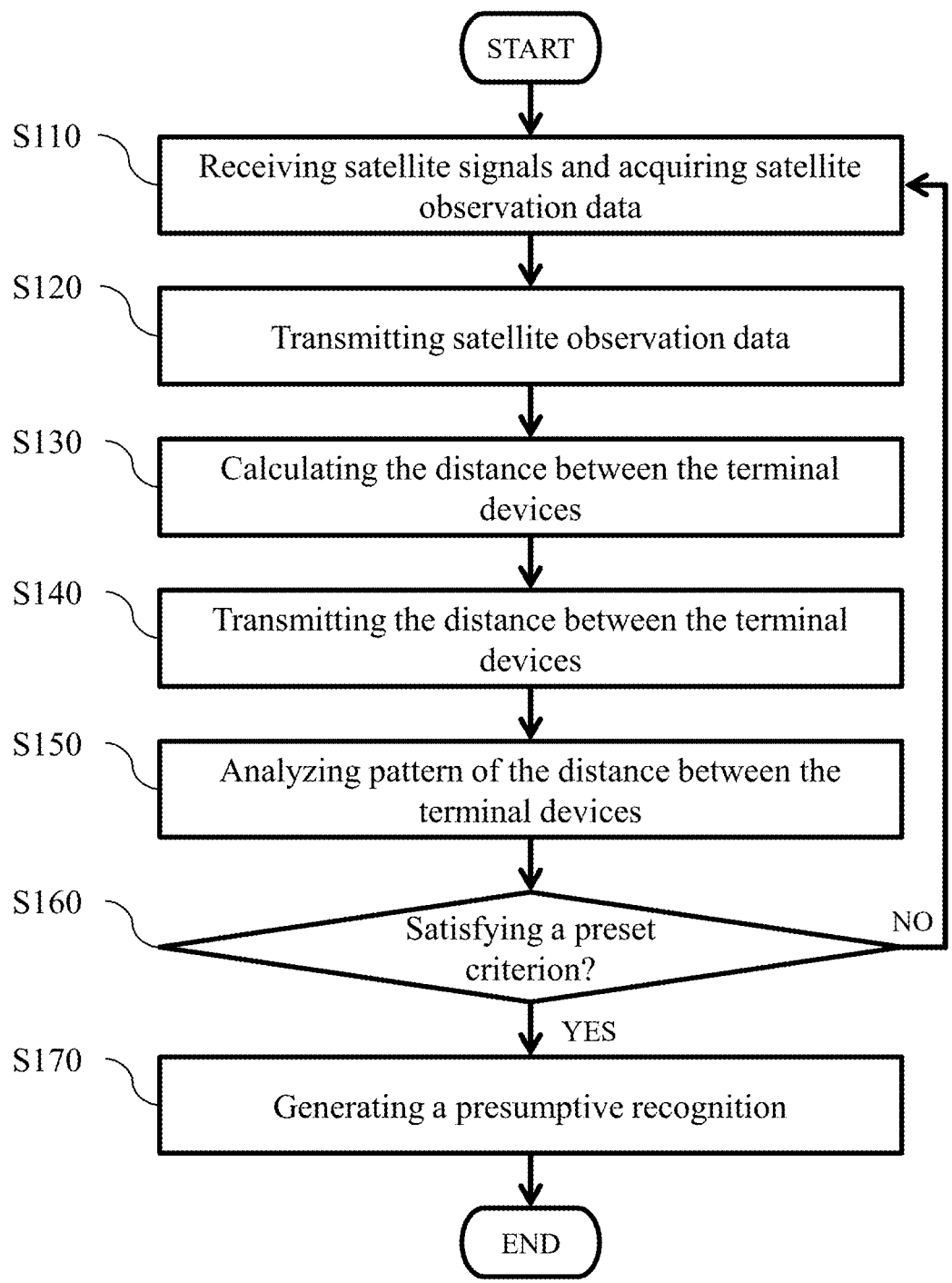
FIG. 2 is a flowchart illustrating a procedure of a process for presumptive recognition of a meeting.

FIG. 2 is a flowchart illustrating a procedure of a process for presumptive recognition of a meeting.

One of the application server 110, the first terminal application 120, or the second terminal application 140 has the ability to perform an RTK algorithm and is pre-designated as an RTK algorithm execution unit.

The first terminal application 120 and the second terminal application 140 receive signals from the GNSS navigation satellites 160 and derive satellite observation data (S110).

A terminal device other than the RTK algorithm execution unit transmits its own satellite observation data to the RTK algorithm execution unit (S120).

Given the satellite observation data of the first terminal device 130 and the satellite observation data of the second terminal device 150, the RTK algorithm execution unit performs an RTK algorithm and calculates the distance between the first terminal device 130 and the second terminal device 150 (S130).

If the RTK algorithm execution unit is not the application server 110, the RTK algorithm execution unit transmits the distance between the terminal devices to the application server 110 through a communication network (S140).

The application server 110 repeatedly records the distance between the terminal devices and analyzes pattern of the distance (S150).

If pattern of the distance between the terminal devices satisfies a preset criterion, the application server 110 generates a presumptive recognition that the holder of the first terminal device 130 and the holder of the second terminal device 150 have met each other, and the related tasks are processed without delay (S170).

A typical criterion may have patterns in which the distance between terminal devices monotonically decreases and then continues to increase or decrease below the human wingspan, and can be pre-determined by the service provider according to the nature of the service.

FIG. 3 is a flowchart illustrating a procedure for receiving and processing an objection to the presumptive recognition of a meeting.

The application server 110 analyzes pattern of the distance between the terminal devices, generates a presumptive recognition that the holder of the first terminal device 130 and the holder of the second terminal device 150 have met, and transmits notification messages announcing the presumptive recognition to the first terminal application 120 and/or the second terminal application 140 (S210).

If the holders of each terminal attempt to invalidate the presumptive recognition because meeting has not actually occurred even though the distance between the terminal devices has been considerably reduced, his terminal application can be used to transmit objection messages to the application server 110 (S220).

If the application server 110 has received no objection messages within a preset period, the application server 110 confirms that the holder of the first terminal device 130 and the holder of the second terminal device 150 agree to the presumptive recognition (S230).

The application server 110 receives the objection message, analyzes the content of the objection message, and can withdraw the presumptive recognition and perform a necessary follow-up task (S240).

The method of the present invention comprising the step of presumptively recognizing that a meeting of the holders of the terminal devices has occurred if a certain criterion is satisfied with the precisely calculated distance between the terminal devices using navigation satellites and RTK technology and the step of challenging the presumptive recognition by raising an objection within a certain period by a service user only for some exceptional cases in which the meeting of the holders of the terminal devices has not occurred despite of satisfying the preset criteria improves, by means of changing a recognizer from a service user to a service provider, the inconvenience and inefficiency of the existing method in a service where meeting between people is important.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method for recognizing a meeting between holder of a first terminal device capable of receiving navigation satellite (GNSS) signal and holder of a second terminal device capable of receiving navigation satellite signal, the method comprising:
   at each of a first application of the first terminal device and a second application of the second terminal device, deriving satellite observation data from received navigation satellite signal;
   at all terminal devices other than the terminal which is also operating as a real-time kinematic (RTK) algorithm execution unit, transmitting satellite observation data to the RTK algorithm execution unit through a communication network;
   at the RTK algorithm execution unit, calculating terminal-to-terminal distance between the first terminal device and the second terminal device from satellite observation data of the first terminal device and satellite observation data of the second terminal device;
   at the RTK algorithm execution unit which is separate from an application server, transmitting the terminal-to-terminal distance to an application server through a communication network;
   at the application server, identifying that a pattern of the terminal-to-terminal distance meets a preset criterion and generating a presumptive recognition that holder of the first terminal device and holder of the second terminal device have met; and
   at the application server, transmitting a notification announcing the presumptive recognition to the application of the first terminal device and/or the application of the second terminal device through a communication network.

2. The method of claim 1, further comprising:
   at the application server, receiving, if any, an objection generated by either the application of the first terminal device or the application of the second terminal device in response to the notification, through a communication network; and
   at the application server, identifying that the application server has received no objections in response to the notification for a preset period of time after the application server transmitted the notification, and confirming the presumptive recognition as agreed upon by interested parties.

3. The method of claim 1, wherein the application server and each application of the terminal devices are applied to a delivery service, the first terminal device is possessed by an orderer and the second terminal device is possessed by a delivery person, and the application server identifies that a pattern of the terminal-to-terminal distance meets the preset criterion set by the delivery service provider and generates a presumptive recognition that an orderer and a delivery person have met and goods have been delivered when the terminal-to-terminal distance meets the preset criterion set by the delivery service provider.

4. A system for recognizing a meeting between holder of a first terminal device capable of receiving navigation satellite (GNSS) signal and holder of a second terminal device capable of receiving navigation satellite signal,
   the system comprising:
   a first application for deriving satellite observation data from received signal of the GNSS navigation satellite at the first terminal device;
   a second application for deriving satellite observation data from received signal of the GNSS navigation satellite at the second terminal device; and
   an application server communicating with the first application and the second application,
   wherein one of the first application, the second application and the application server performs a real-time kinematic (RTK) algorithm to calculate terminal-to-terminal distance between the first terminal device and the second terminal device from satellite observation data of the first terminal device and satellite observation data of the second terminal device,
   wherein the application server generates a presumptive recognition that holder of the first terminal device and holder of the second terminal device have met when a pattern of the terminal-to-terminal distance meets a preset criterion, and
   wherein the application server transmits a notification announcing the presumptive recognition to the application of the first terminal device and/or the application of the second terminal device through a communication network.

\* \* \* \* \*